United States Patent

Leahy et al.

[11] Patent Number: 5,832,605
[45] Date of Patent: Nov. 10, 1998

[54] METHODS FOR FABRICATING A HELICOPTER MAIN ROTOR BLADE

[75] Inventors: Kevin P. Leahy, Naugatuck; Corey D. Jones, Prospect; David A. Kovalsky, Huntington, all of Conn.

[73] Assignee: Sikorsky Aircraft Corporation, Stratford, Conn.

[21] Appl. No.: 838,295

[22] Filed: Apr. 16, 1997

[51] Int. Cl.$^6$ .................................................. B23P 15/00
[52] U.S. Cl. .................. 29/884.6; 29/889.61; 29/23.51
[58] Field of Search .............................. 21/889.6, 889.61, 21/23.51, 822, 823, 824, 706, 700, 707

[56] References Cited

U.S. PATENT DOCUMENTS

| | | | |
|---|---|---|---|
| 1,967,487 | 7/1934 | Wainus | 29/889.6 |
| 2,421,956 | 6/1947 | McComb | 29/889.6 |
| 2,742,947 | 4/1956 | Dobbs | 29/889.6 |
| 4,407,688 | 10/1983 | Mussi et al. | 29/889.6 |
| 4,776,076 | 10/1988 | Frank et al. | 29/889.6 |
| 4,868,962 | 9/1989 | McDonald | 29/889.6 |
| 5,430,937 | 7/1995 | Leahy et al. | 29/889.6 |
| 5,528,828 | 6/1996 | Leahy et al. | 29/889.6 |
| 5,570,631 | 11/1996 | Leahy et al. | 100/211 |

*Primary Examiner*—Irene Cuda
*Attorney, Agent, or Firm*—Adam C. Solomon

[57] ABSTRACT

A method for fabricating a helicopter blade subassembly includes the steps of providing a blade compaction apparatus having a lower assembly configured for mating with an upper assembly. The lower assembly includes a base having a contoured upper airfoil nest with at least two guide ramps and a plurality of leading-edge pusher cams disposed proximal thereto. The upper assembly includes a support structure supporting a flexible impervious membrane, wherein the flexible impervious membrane and the contoured upper airfoil nest define a molding cavity therebetween upon mating of the upper assembly to the lower assembly. The method further includes disposing the upper airfoil skin and the core in combination with the contoured upper airfoil nest, and then connecting a tip end support insert and a root end support insert in combination with the spar assembly, wherein each of the support inserts include guide members. The spar assembly is located in chordwise alignment in the contoured upper airfoil nest by driving the guide members into conics in the guide ramps and driving the spar assembly into a core conic with the leading-edge pusher cams. The lower airfoil skin is then disposed in combination with the core and the spar to form the helicopter blade subassembly, and then the upper assembly is mated to the lower assembly. The air within the molding cavity is then evacuated such that evacuating the air causes the flexible impervious membrane to apply compaction forces to the helicopter blade subassembly.

7 Claims, 12 Drawing Sheets

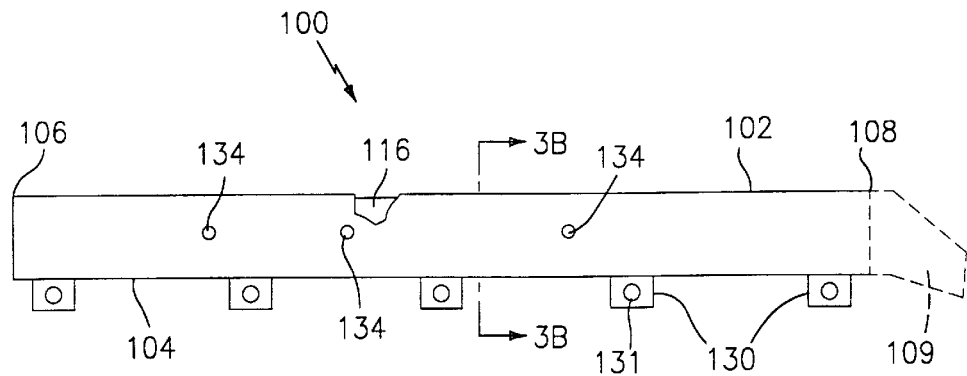
FIG. 3A
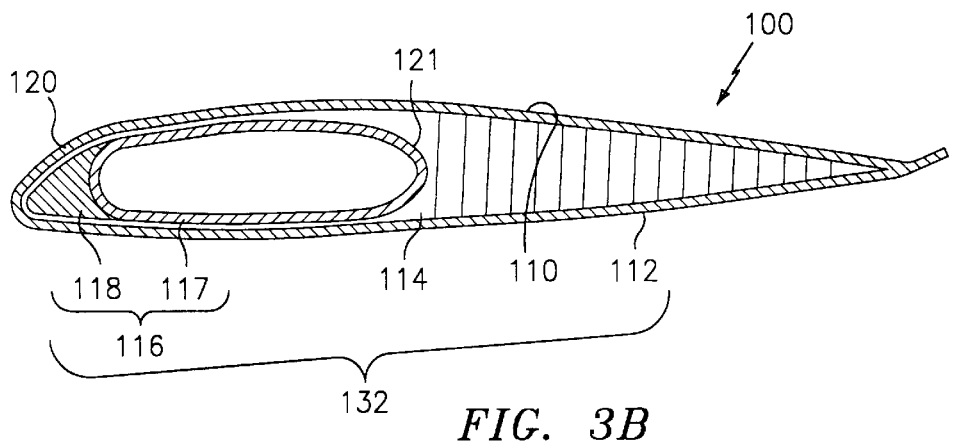
FIG. 3B
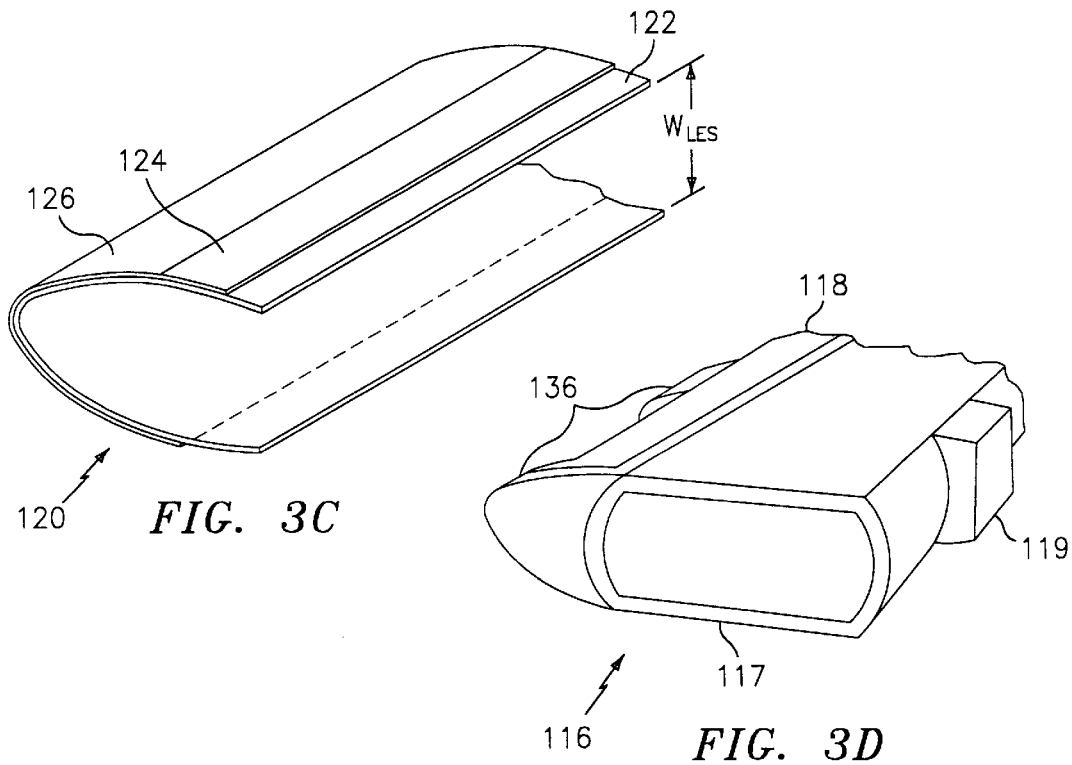
FIG. 3C
FIG. 3D

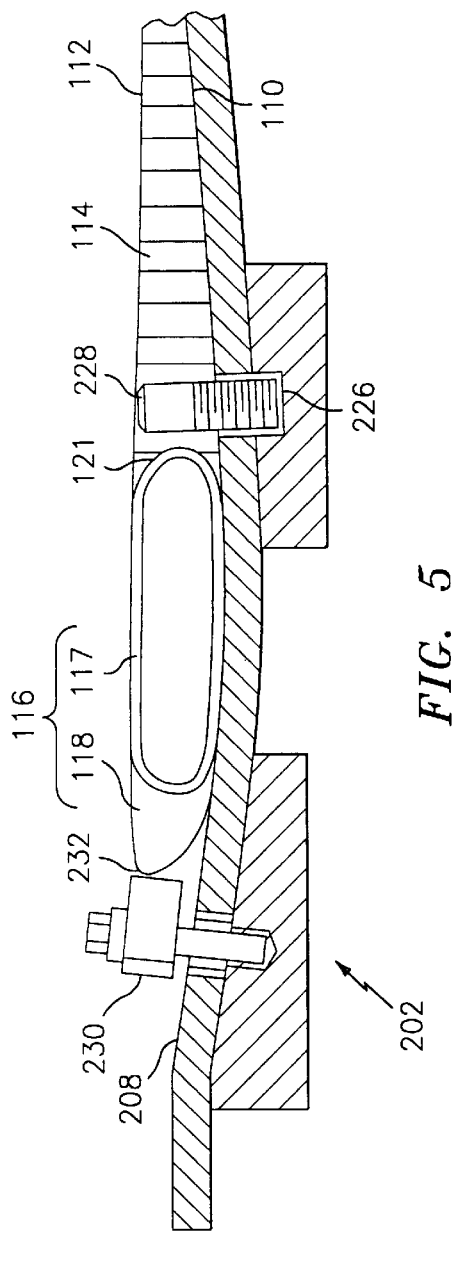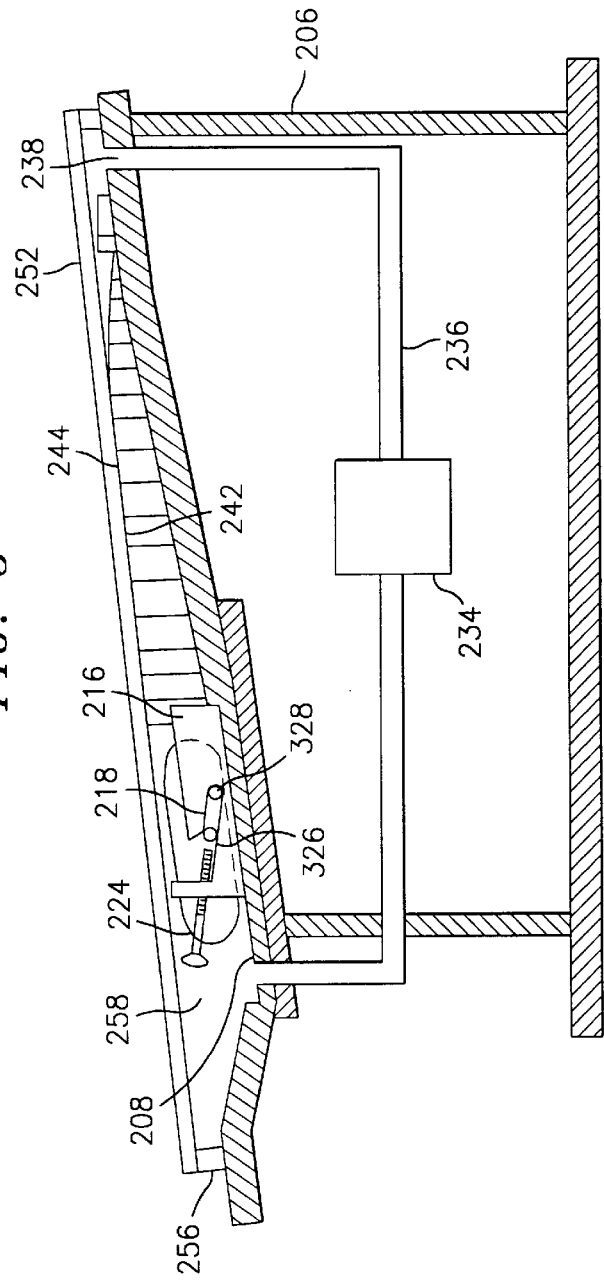

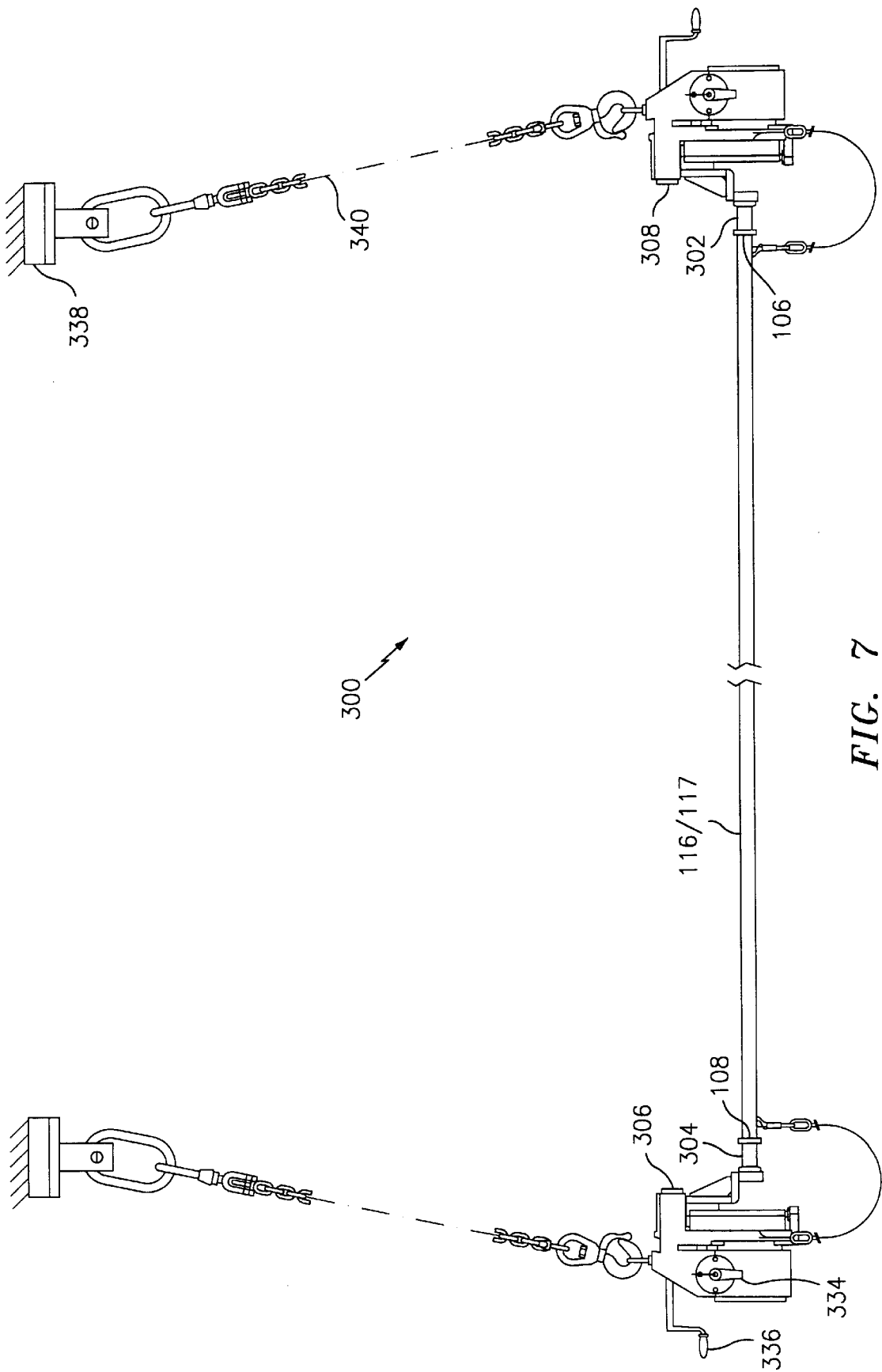

METHODS FOR FABRICATING A HELICOPTER MAIN ROTOR BLADE

This invention was made with Government support Contract No. DAAJ0992-C-0004 awarded by the Department of the Army. The Government has certain rights in this invention.

RELATED APPLICATION

The present application is related to commonly-owned, co-pending U.S. patent application entitled APPARATUS FOR INSTALLING A LEADING-EDGE SHEATH ONTO A HELICOPTER MAIN ROTOR BLADE SUBASSEMBLY U.S. Ser. No. 09/838,214, and to commonly-owned, co-pending U.S. patent application entitled APPARATUS FOR ASSEMBLING A HELICOPTER MAIN ROTOR BLADE SUBASSEMBLY U.S. Ser. No. 08/843,527.

TECHNICAL FIELD

This invention relates generally to manufacturing methods, and more particularly, to methods for fabricating a helicopter main rotor blade.

BACKGROUND ART

There is a growing trend in the aerospace industry to expand the use of composite materials for a diverse array of structural and dynamic applications. One particular application for the use of composite materials lies in the fabrication of main rotor blades for helicopters.

Sikorsky Aircraft has developed a parallel manufacturing protocol for fabricating helicopter main rotor blades wherein a blade subassembly and a leading-edge sheath are concurrently fabricated as individual components, and then the prefabricated blade subassembly and the prefabricated leading-edge sheath are integrated in combination to form an assembled main rotor blade. The assembled main rotor blade is placed in a clamshell and is subsequently cured in an autoclave to form a finished main rotor blade.

In one prior art process for fabricating main rotor blades, the blade subassembly portion of the parallel manufacturing protocol begins with a composite skin and honeycomb core combination being placed in a plastic nest having a contour corresponding to the blade's upper airfoil, and manually positioned spanwise and chordwise using a plurality of locator pins. A titanium spar coated with adhesive is manually positioned in combination with the skin and honeycomb core combination and is seated within a conic in the honeycomb core. The honeycomb core is then coated with an adhesive and a second composite skin is placed over the honeycomb core and a portion of the spar, and is likewise positioned using the locator pins. A plastic lid having a contour corresponding to the blade's lower airfoil is then placed over the second composite skin and is mated in combination with the plastic nest using a plurality of clamps such that a compaction force is applied to the blade subassembly.

The second part of this process for manufacturing main rotor blades involves the placement of the leading-edge sheath onto the exposed leading edge of the blade subassembly. The leading-edge sheath has a prefabricated configuration that does not allow the sheath to be inserted directly onto the blade subassembly. Rather, the aft edges of the leading-edge sheath must be spread apart to allow the leading-edge sheath to be inserted onto the blade subassembly. The prior art sheath spreader tool comprises segmented angular stainless steel sheet metal grabbers that are disposed spanwise in combination with the aft edges of the leading-edge sheath in contact with its inner mold line (IML) surfaces (which are formed of composite material). Each segment of the prior art grabber is individually actuated by means of a side cam lever, thereby spreading the aft edges of the leading-edge sheath.

Adhesive is applied to the leading edge of the blade subassembly, followed by the blade subassembly tool being rotated 90° such that the leading edge of the blade subassembly faces up. The sheath spreader tool is then hoisted up by a crane and lowered onto the blade subassembly tool such that the leading-edge sheath is placed over the leading edge of the blade subassembly. The sheath spreader tool is then drawn down toward the blade subassembly tool using a plurality of threaded rods until the sheath spreader tool engages predetermined tooling stops. This process of "drawing down" the sheath spreader tool generates significant stresses on the leading-edge sheath. The aft edges of the leading-edge sheath are then released by the sheet metal grabbers such that the leading-edge sheath is secured onto the leading edge of the blade subassembly.

A significant drawback to the blade subassembly tool used in the process described above is the inadequate compaction provided to the blade subassembly by the plurality of clamps operating in combination with the plastic nest and lid. Specifically, the compaction forces imparted by the tool onto the blade subassembly are uneven over the span of the blade since each clamp provides its maximum compaction force on the blade subassembly only at its discrete spanwise location. Experience with this method and blade subassembly tool has shown that the compaction provided by the clamps is such that once the completed blade is removed from the blade subassembly tool, the blade has to be placed into the clamshell and autoclave within a half hour of compaction such that the entire blade assembly doesn't disbond.

In addition to providing inadequate compaction over the span of the blade subassembly, the prior art blade subassembly tool described above also provides inadequate chordwise compaction coverage for the blade subassembly. Since the blade subassembly tool remains in place about the blade subassembly as the sheath spreading tool is being operated, it follows that the blade subassembly tool cannot fully extend to the leading edge of the blade subassembly. Therefore, the portions of the upper and lower airfoil skins located proximal to the leading edge of the blade subassembly are not subject to direct compaction, and therefore may not be adequately secured to the spar. A disadvantage of this incomplete compaction is that upon placement of the leading-edge sheath over the leading edge of the blade subassembly, if either of the composite skins separates from the spar, the result can be that one or both of the aft edges of the leading-edge sheath will slide under the composite skin, thereby providing an improper interface between the leading-edge sheath and the blade subassembly, resulting in rejection of the assembled blade.

Another area of concern in the parallel manufacturing protocol described above is the sheath spreader tool used to integrate the leading-edge sheath with the blade subassembly. The prior art grabbers exert a shearing action against the IML surfaces of the leading-edge sheath when spreading the aft edges of the leading-edge sheath apart. This shearing action by the prior art grabbers can cause cracks and delaminations in the leading-edge sheath's composite materials, thereby resulting in component rejection and rework. In addition, the operation of the prior art grabbers is such that the grabbers can contaminate clean bond surfaces of the leading-edge sheath. Also, the segments of the grabber are individually actuated in a sequential manner such that multiple repetitive operations are necessary to spread apart the entire leading-edge sheath. Not only is such a procedure labor intensive, time consuming, and costly, such a procedure may induce unwanted stresses into the aft edges of the leading-edge sheath.

Another approach for manufacturing main rotor blades is disclosed in U.S. Pat. Nos. 5,528,828, METHODS FOR FABRICATING A HELICOPTER MAIN ROTOR BLADE, and 5,570,631, APPARATUS FOR FABRICATING A HELICOPTER MAIN ROTOR BLADE, both assigned to the United Technologies Corporation (hereinafter "'828 patent" and "'631 patent" respectively). As depicted in FIGS. 1 and 2, the apparatus disclosed in the '828 patent and the '631 patent comprises a compaction fixture 10 for assembling and compacting a blade subassembly 24, and a sheath spreading/insertion apparatus 50 for spreading and inserting a leading-edge sheath 22 onto the blade subassembly 24 during the compaction process, wherein the blade subassembly 24 comprises an upper airfoil skin 12, a lower airfoil skin 18, a core 14, and a spar assembly 16.

The compaction fixture 10 includes a lower assembly 26 having a contoured upper airfoil nest 28 mounted in combination with a support structure 30, and an upper assembly 32 having a pressure bag 34 affixed in sealed combination to a contoured backplate 36 affixed in combination to a structural support truss 38. The contoured upper airfoil nest 28 includes a plurality of tooling pins 31 for locating the upper airfoil skin 12 in aligned combination on the contoured upper airfoil nest 28 and a plurality of backwall pusher pins 39 for chordwise alignment of the spar assembly 16 in the contoured upper airfoil nest 28. Spar stanchions 40 affixed to the support truss 38 provide spanwise alignment of the spar assembly 16 in the contoured upper airfoil nest 28. With the upper and lower assemblies 32, 26 in locked combination, the pressure bag 34 is pressurized to compact the assembled blade subassembly components 12, 14, 16, 18.

The sheath spreading/insertion apparatus 50 includes a movable stanchion 52, upper and lower elongate carriage members 54, 56 mounted in synchronized movable combination with the stanchion 52, and rows of suction cups 58, 60 mounted in combination with the carriage members 54, 56. Pneumatic cylinders 61, 62 are interposed between the stanchion 52 and each of the respective carriage members 54, 56. Pressurization of the pneumatic cylinders 61, 62 causes synchronized movement of the upper and lower carriage members 54, 56 between a disengaged position wherein the leading-edge sheath 22 can be inserted between the upper and lower rows of suction cups 58, 60, an engaged position wherein the suction cups 58, 60 abuttingly engage respective outer mold line (OML) surfaces of the leading-edge sheath 22, and an operating position wherein the leading-edge sheath 22 is spread apart for insertion onto the blade subassembly 24 during compaction thereof. A vacuum source 64 is pneumatically interconnected to the suction cups 58, 60 to generate suction forces therein in the engaged position to cause the suction cups 58, 60 to engage the respective OML surfaces of the leading-edge sheath 22 such that subsequent synchronized movement of the upper and lower carriage members 54, 56 to the operating position causes the leading-edge sheath 22 to be spread apart. Movement of the movable stanchion 52 causes the spread-apart leading-edge sheath 22 to be placed onto the blade subassembly 24 during compaction.

As with the blade subassembly tool described earlier, a drawback to the methods and apparatus disclosed for the '828 patent and '631 patent is that the compaction fixture 10 does not provide adequate compaction between the spar assembly 16 and the portions of the composite skins 12, 18 located proximal to the leading edge 42 of the blade subassembly 24. As illustrated in FIG. 2, since the movable stanchion 52 places the leading-edge sheath 22 onto the blade subassembly 24 during compaction, there must be enough clearance about the leading edge of the blade subassembly 24 to physically allow the movable stanchion 52 to translate horizontally into proper position. Therefore, the pressure bag 34 does not fully cover the leading edge of the blade subassembly 24, and accordingly, the upper and lower airfoil composite skins 12, 18 cannot be properly compacted onto the spar assembly 16 in that area. As a result, it has been found that the leading edges of these composite skins 12, 18, also known as "joggles", can have a tendency to lift-up off the spar assembly 16 in this leading edge area. These joggles each define a "step" upon which the leading-edge sheath 22 must overlap the corresponding composite skin 12, 18 in order to have a proper interface between the leading-edge sheath 22 and the blade subassembly 24. In the event that the joggles lift-up off the spar assembly 16, the leading-edge sheath 22 could slide under the joggles during installation, thereby forming an improper and unacceptable interface between the leading-edge sheath 22 and the blade subassembly 24.

In addition, drawbacks in the design of the sheath-spreading/insertion apparatus 50 disclosed in the '828 patent and '631 patent can further increase the possibility of an improper interface between the leading-edge sheath 22 and the blade subassembly 24 during installation. Specifically, when the leading-edge sheath 22 is positioned between the rows of suction cups 58, 60, and the upper and lower carriage members 54, 56 are in the operating position, the weight of the leading-edge sheath 22 generates a downward force upon the lower row of suction cups 60 and upon the lower carriage member 56. It has been found that this downward force on the lower carriage member 56 is not sufficiently counteracted by the pressure supplied to the lower pneumatic cylinders 62, and therefore, the lower carriage member 56 has a tendency to drift downward in response to the weight of the leading-edge sheath 22. In addition, since the suction cups 58, 60 comprise rubber bellows, the weight of the leading-edge sheath 22 can also collapse the bellows in the lower row of suction cups 60 and stretch the bellows in the upper row of suction cups 58. The downward forces on the carriage member 56, in combination with the tendency of the lower suction cups 60 to collapse, causes the aft edges of the leading-edge sheath 22 to skew downward such that a misalignment can occur between the leading-edge sheath 22 and the blade subassembly 24. The nature of this misalignment can be such that as the stanchion 52 is moved horizontally, and as the leading-edge sheath 22 approaches the leading edge of the blade subassembly 24, the skew of the leading-edge sheath 22 can cause the upper aft edge of the leading-edge sheath 22 to dig under the joggle on the lower airfoil composite skin 18, thereby forming an improper interface.

Compounding this problem is the fact that when the stanchion 52 is located proximal to the compaction fixture 10, the compaction fixture 10 and the sheath-spreading/insertion apparatus 50 occlude the aft edges of the leading-edge sheath 22 and make it very difficult for the operator to visually discern whether the aft edges of the leading-edge sheath 22 are in the proper position for installation. In an effort to compensate for the uncertainty in the alignment of the aft edges of the leading-edge sheath 22, the aft edges of the leading-edge sheath 22 can be spread wider apart (greater than a preferred 1.27 cm (0.5 in.) displacement on each side) such that it will be less likely for one of the aft edges to dig under one of the joggles. However, a drawback to spreading the aft edges in excess of 1.27 cm (0.5 in.) on each side is that the composite materials and the heater mat in the leading-edge sheath 22 may be more susceptible to failure and rework due to the stresses generated by such an overspread.

DISCLOSURE OF THE INVENTION

It is therefore an object of the present invention to provide a method for fabricating a helicopter main rotor blade that provides complete chordwise and spanwise compaction to the blade subassembly.

Another object of the present invention is to provide a method for fabricating a helicopter main rotor blade that reduces the extent of manual labor needed to lift, transport, and accurately position main rotor blade components.

Still another object of the present invention is to provide a method for fabricating a helicopter main rotor blade that provides uniform spreading and alignment of the aft edges of the leading-edge sheath.

Yet another object of the present invention is to provide a method for fabricating a helicopter main rotor blade that provides a non-occluded view of the aft edges of the leading-edge sheath and the joggles of the blade subassembly during installation of the leading-edge sheath onto the blade subassembly.

These objects and others are achieved in the present invention by a method for fabricating a helicopter blade subassembly comprising a lower airfoil skin, a core having a conic formed therein, an upper airfoil skin, and a spar assembly having a tip end and a root end.

The method comprises the steps of providing a blade compaction apparatus having a lower assembly configured for mating with an upper assembly. The lower assembly comprises a base having a contoured upper airfoil nest, including a root end and a tip end, at least two guide ramps disposed proximal to the contoured upper airfoil nest, wherein the guide ramps define conics therein, and wherein at least one of the guide ramps is disposed proximal to the root end and at least one of the guide ramps is disposed proximal to the tip end, and a plurality of leading-edge pusher cams disposed proximal to the contoured upper airfoil nest.

The upper assembly comprises a support structure supporting a flexible impervious membrane, wherein the flexible impervious membrane and the contoured upper airfoil nest defme a molding cavity therebetween upon mating of the upper assembly to the lower assembly.

The method further comprises the steps of disposing the upper airfoil skin and the core in combination with the contoured upper airfoil nest, connecting a tip end support insert in combination with the tip end of the spar assembly, connecting a root end support insert in combination with the root end a of the spar assembly, wherein the tip end support insert and the root end support insert each has guide surfaces and guide members configured for use in combination with the guide ramps. The spar assembly is then located in spanwise alignment in the contoured upper airfoil nest by abutting at least one of the guide surfaces against at least one of the guide ramps. The spar assembly is located in chordwise alignment in the contoured upper airfoil nest by driving the guide members into the conics in the guide ramps and driving the spar assembly into the conic in the core with the leading-edge pusher cams. The lower airfoil skin is then disposed in combination with the core and the spar assembly to form the helicopter blade subassembly, and then the upper assembly is mated to the lower assembly. The air within the molding cavity is then evacuated, such that evacuating the air causes the flexible impervious membrane to apply compaction forces to the helicopter blade subassembly.

Still other objects and advantages of the present invention will become readily apparent to those skilled in this art from the following detailed description, wherein the preferred embodiments of the invention are shown and described, simply by way of illustration of the best mode contemplated of carrying out the invention. As will be realized, the invention is capable of modifications in various respects, all without departing from the invention. Accordingly, the drawings and description are to be regarded as illustrative in nature, and not as restrictive.

BRIEF DESCRIPTION OF THE DRAWINGS

FIG. 3A is a top plan view of an exemplary main rotor blade for an H-60 helicopter;

FIG. 3B is a cross-sectional view of the main rotor blade of FIG. 3A taken along line 3B—3B thereof;

FIG. 3C is an enlarged partial perspective view of the leading-edge sheath illustrated in FIG. 3B;

FIG. 3D is an enlarged partial perspective view of a spar assembly for the exemplary main rotor blade of FIG. 3A;

FIG. 5 is a partial cross-sectional view of the blade compaction apparatus of FIG. 4 taken along line 5—5 thereof, including the cross-sectional view of the main rotor blade of FIG. 3B;

FIG. 6 is a cross-sectional view of the blade compaction apparatus of FIG. 4 taken along line 6—6 thereof, including the cross-sectional view of the main rotor blade of FIG. 3B, and depicting the upper assembly in mated engagement with the lower assembly;

FIG. 7 is a plan view of a support apparatus embodying features of the present invention, supporting the spar assembly of FIG. 3D;

BEST MODE FOR CARRYING OUT THE INVENTION

Figure 1:
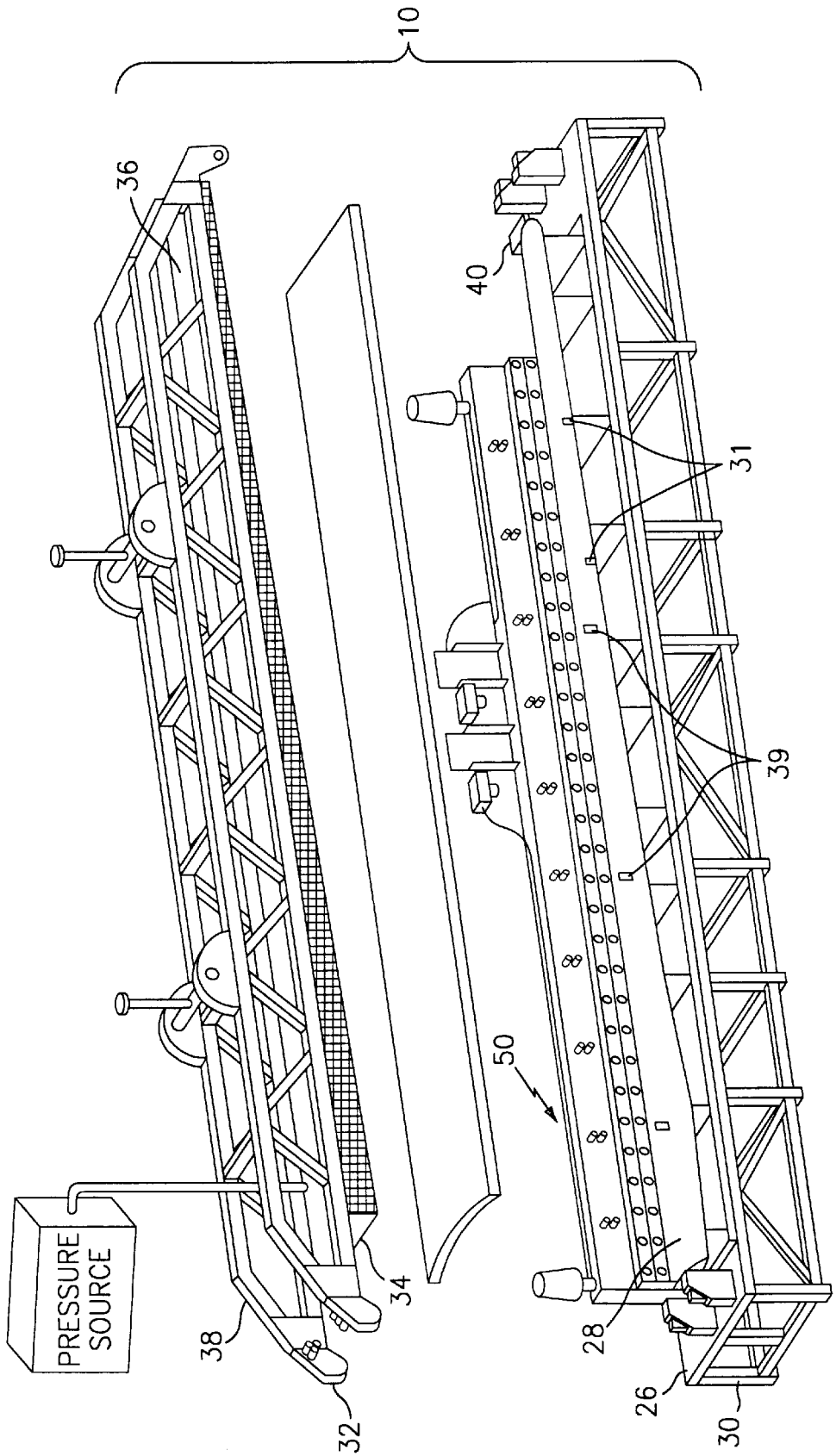
FIG. 1 is a perspective view of a prior art compaction fixture and sheath spreading/insertion apparatus.
Figure 2:
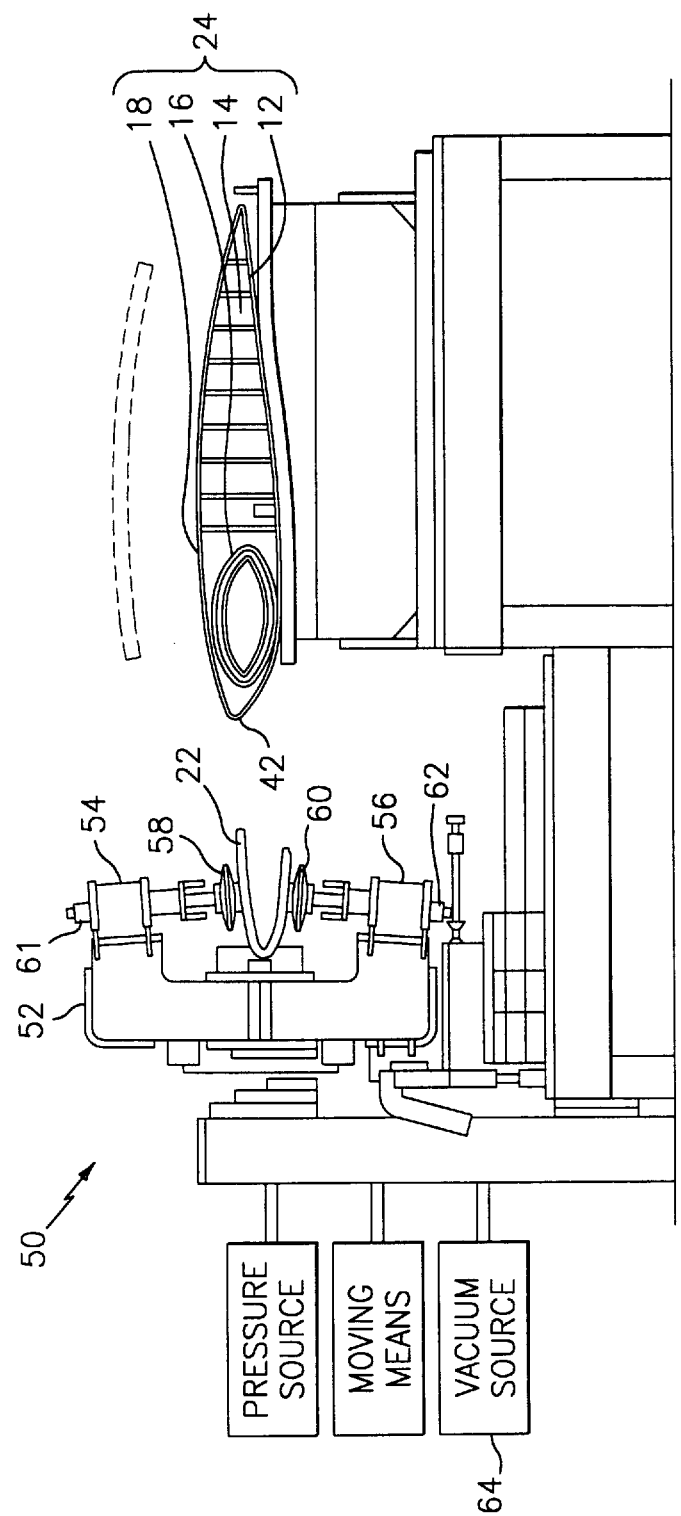
FIG. 2 is a partial plan view of the prior art apparatus of FIG. 1.

The apparatus and methods described in further detail hereinbelow comprise part of the manufacturing protocol for fabricating main rotor blades for H-60 helicopters manufactured by the Sikorsky Aircraft Corporation. It will be appreciated, however, that the apparatus and methods described herein have applicability in fabricating main rotor blades in general.

MAIN ROTOR BLADE

An H-60 main rotor blade 100 is exemplarily illustrated in FIGS. 3A–3D, and includes a leading edge 102 and a trailing edge 104, which in combination define the chord of the rotor blade 100, and a root end 106 and a tip end 108 which in combination define the span of the rotor blade 100 (a tip cap 109 for the main rotor blade 100, is separately fabricated for connection to the tip end 108 of the main rotor blade 100). The main rotor blade 100 comprises upper and lower airfoil skins 110, 112 that define the upper and lower aerodynamic surfaces of the blade 100, respectively, a core 114, a spar assembly 116, and a leading-edge sheath 120. The upper and lower airfoil skins 110, 112, the core 114, and the spar assembly 116, in combination defme a blade subassembly 132.

In the described embodiment, the upper and lower airfoil skins 110, 112 are prefabricated components formed from several plies of prepreg composite material of a type known to those skilled in the art, e.g., woven fiberglass material embedded in a suitable resin matrix. A plurality of corresponding trailing-edge tooling tabs 130 extend from the trailing edges of the upper and lower airfoil skins 110, 112, wherein each of the trailing-edge tooling tabs 130 have apertures 131 formed therein. As will be more fully discussed below, the trailing-edge tooling tabs 130 facilitate proper spanwise and chordwise positioning of the upper and lower airfoil skins 110, 112 during the blade assembly process.

In the described embodiment, the core 114 is fabricated from honeycomb material of a type typically used in aerospace applications, e.g., NOMEX® (NOMEX® is a registered trademark of E. I. du Pont de Nemours & Co., Wilmington, Del. for aramid fibers or fabrics) and functions as a low weight, structural stiffening member between the upper and lower airfoil skins 110, 112. The leading edge of the core 114 defines a conic 121 configured for mating with the trailing edge of the spar assembly 116. The upper airfoil skin 110, lower airfoil skin 112, and core 114 have a plurality of aligned locator apertures 134 formed therethrough to facilitate the location of the spar assembly 116 in a blade compaction apparatus 200 as described in further detail hereinbelow. After the main rotor blade 100 has been assembled, the locator apertures 134 are patched with composite material so that the upper airfoil skin 110 and lower airfoil skin 112 have aerodynamically smooth surfaces.

The spar assembly 116 comprises a spar 117, one or more counterweights 118, and backwall blocks 119. The spar 117 functions as the primary structural member of the main rotor blade 100, reacting the torsional, bending, shear, and centrifugal dynamic loads developed in the rotor blade 100 during operation of the helicopter. The spar 117 of the described embodiment is formed from titanium; however, in alternative embodiments, the spar 117 may be formed from other metals, may be formed from composite materials, or a combination thereof.

The counterweights 118 are utilized to statically and dynamically balance the main rotor blade 100. In the described embodiment, the counterweights 118 are fabricated from less dense to more dense materials, e.g., foam, tungsten, and lead, respectively, in the spanwise direction from the root end 106 to the tip end 108, and provide the necessary weight distribution for statically and dynamically balancing the main rotor blade 100. The counterweights 118 are fabricated to include hardpoints 136 that provide physical engagement between the counterweights 118 and the inner mold line (IML) surface of the leading-edge sheath 120. The counterweights 118 are adhesively bonded to the leading edge of the spar 117 such that the bonded counterweights 118 are interposed between the leading-edge sheath 120 and the leading edge of the spar 117.

The backwall blocks 119 are adhesively bonded to the trailing edge of the spar 117 at discrete locations corresponding to the locator apertures 134 in the upper airfoil skin 110 and the core 114. As with the locator apertures 134, the backwall blocks 119 facilitate the location of the spar assembly 116 in the blade compaction apparatus 200 as described in further detail hereinbelow.

In the described embodiment, the leading-edge sheath 120, which is illustrated in greater detail in FIG. 3C, is a prefabricated hybrid component fabricated from composite materials and abrasion-resistive materials. The sheath 120 has a generally U-shaped configuration that defines the leading edge 102 of the main rotor blade 100. The sheath 120 comprises one or more plies 122 of prepreg composite material, e.g., woven fiberglass material embedded in a suitable resin matrix, that define the inner mold line (IML) of the leading-edge sheath 120, a first abrasion strip 124, and a second abrasion strip 126. The leading-edge sheath 120 provides abrasion protection for the leading edge 102 of the main rotor blade 100, controls airfoil tolerances of the main rotor blade 100, and houses the main rotor blade de-icer assembly (not shown).

As will be discussed more fully below, the methods for manufacturing the main rotor blade 100 include the use of the blade compaction apparatus 200, a support apparatus 300, and a leading-edge sheath installation apparatus 400.

BLADE COMPACTION APPARATUS

Figure 4:
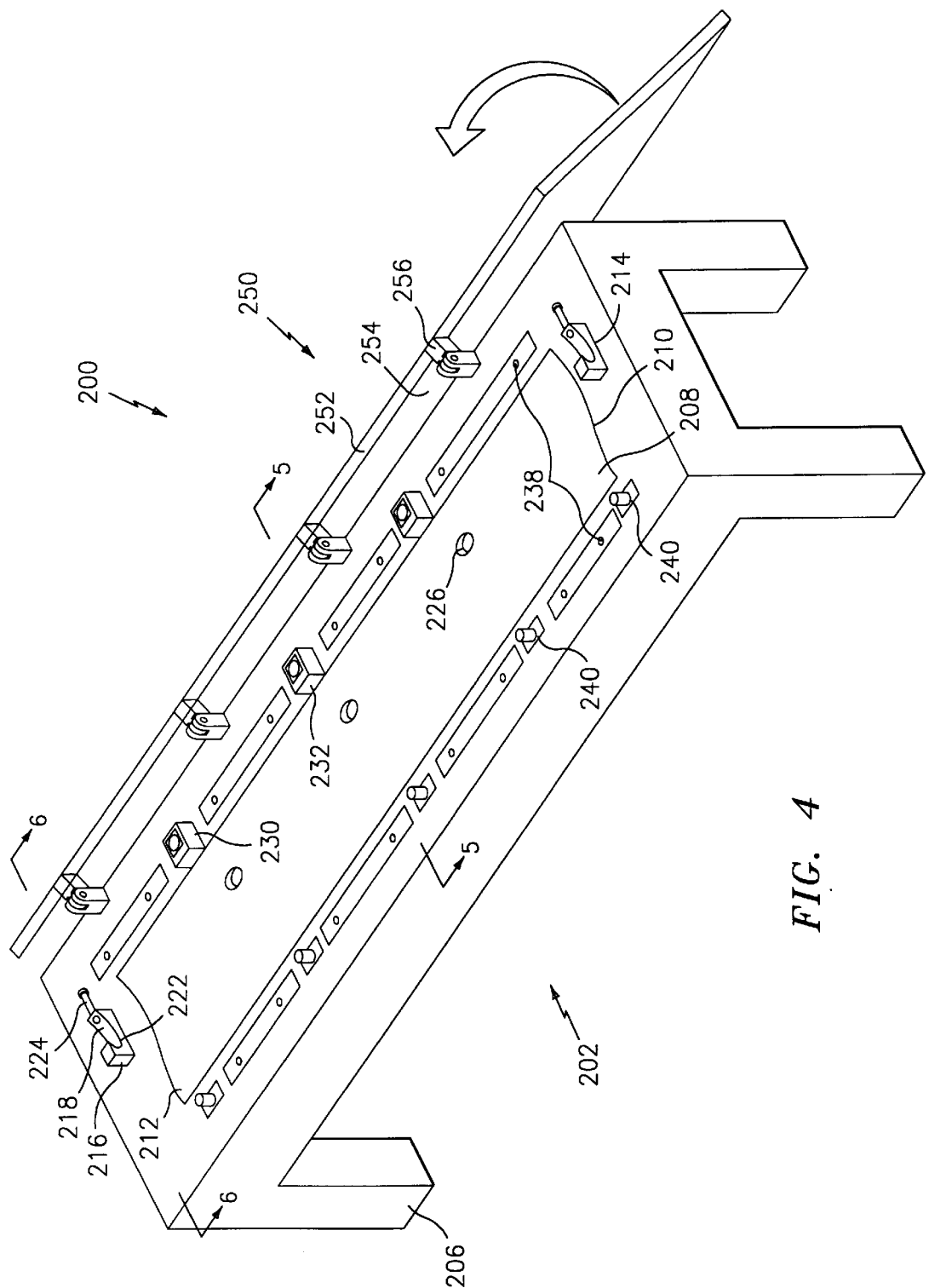
FIG. 4 is a perspective view of a blade compaction apparatus embodying features of the present invention.

Referring to FIG. 4, the blade compaction apparatus 200 is provided having a lower assembly 202 configured for mating with an upper assembly 250. The lower assembly 202 comprises a base 206 having a contoured upper airfoil nest 208, wherein the contoured upper airfoil nest 208 is configured to match the contour of the upper airfoil of the blade subassembly 132, and has an inboard end 210 corresponding to the root end 106 of the blade subassembly 132 and an outboard end 212 corresponding to the tip end 108 of the blade subassembly 132. Two guide ramps 214, 216 are disposed proximal to the contoured upper airfoil nest 208 such that the guide ramp 214 is disposed proximal to the inboard end 210 of the contoured upper airfoil nest 208, and the guide ramp 216 is disposed proximal to the outboard end 212 of the contoured upper airfoil nest 208. Each of the guide ramps 214, 216 has a ramp surface 218 defined therein, terminating at a conic 222. In addition, a threaded bolt 224 is disposed in combination with each of the guide ramps 214, 216 such that rotation of the threaded bolt 224 causes the threaded bolt 224 to translate across the ramp surface 218 and toward the conic 222.

Three backwall pusher pin recesses 226 are formed in the contoured upper airfoil nest 208 at spanwise and chordwise locations corresponding to the locator apertures 134 in the blade subassembly 132. As depicted in FIG. 5, three backwall pusher pins 228 are provided for use in combination with the locator apertures 134 and the backwall pusher pin recesses 226 such that as more fully described below, the backwall pusher pins 228 can be used for various tooling purposes during manufacture of the blade subassembly 132. In addition, three leading-edge pusher cams 230, each having a camming surface 232, are disposed proximal to the leading edge of the contoured upper airfoil nest 208 such that each of the leading-edge pusher cams 230 is disposed at a spanwise location corresponding to the backwall pusher pin recesses 226. The leading-edge pusher cams 230 are configured in a conventional manner as is known in the art for cams, such that activation of the leading-edge pusher cams 230 causes the camming surfaces 232 to advance in a chordwise direction toward the backwall pusher pins 228.

Referring to FIGS. 4 and 6, a vacuum source 234 is disposed in combination with the base 206 and has a plurality of conduits 236 extending therefrom, wherein each of the conduits 236 terminates at a corresponding aperture 238 in the base 206. In the described embodiment, the vacuum source 234 comprises a conventional vacuum pump, and the apertures 238 are aligned into two rows, one located proximal to the leading edge of the contoured upper airfoil nest 208 and one located proximal to the trailing edge of the contoured upper airfoil nest 208. In addition, five spring-loaded tooling tab pins 240 are disposed in a row proximal to the trailing edge of the contoured upper airfoil nest 208 at chordwise and spanwise locations corresponding to the apertures 131 in the blade subassembly 132 trailing-edge tooling tabs 130.

Referring to FIGS. 4 and 6, the upper assembly 250 comprises a support structure 252 supporting a flexible impervious membrane 254. In the described embodiment, the support structure 252 is connected to the base 206 with a plurality of hinges 256 such that the support structure 252 can be pivoted from a first position wherein the flexible impervious membrane 254 does not cover the contoured upper airfoil nest 208 to a second position wherein the flexible impervious membrane 254 covers the contoured upper airfoil nest 208. The support structure 252, flexible impervious membrane 254, contoured upper airfoil nest 208, and base 206 are configured in combination such that when the support structure 252 is in the second position such that the flexible impervious membrane 254 covers the contoured upper airfoil nest 208, an airtight seal is formed between the support structure 252 and the base 206. In addition, when the support structure 252 is in the second position, the flexible impervious membrane 254 and the contoured upper airfoil nest 208 define a molding cavity 258 therebetween. In the described embodiment, the apertures 238 in the base 206 are configured such that upon activation of the vacuum source 234, the vacuum source 234 evacuates the air from within the molding cavity 258, thereby drawing the flexible impervious membrane 254 toward the contoured upper airfoil nest 208.

SUPPORT APPARATUS

Figure 8:
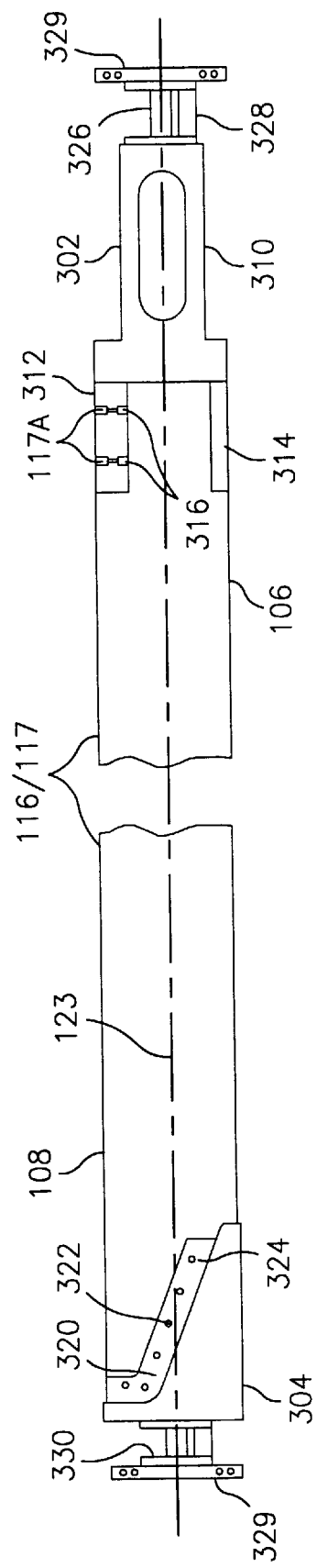
FIG. 8 is a plan view, partly broken away, of the spar assembly and support inserts of FIG. 7.

Referring to FIGS. 3A–D, 4 and 7, the support apparatus 300 is provided for use in combination with the blade compaction apparatus 200 during manufacturing of the blade subassembly 132. The support apparatus 300 comprises a root end support insert 302 configured for connection to the root end 106 of the spar 117, a tip end support insert 304 configured for connection to the tip end 108 of the spar 117, a tip end gearbox 306 connected to the tip end support insert 304, a root end gearbox 308 connected to the root end support insert 302, and a crane apparatus 338 for supporting the root end and tip end gearboxes 308, 306. For the described embodiment as depicted in FIG. 8, the root end support insert 302 comprises a base 310 having a pair of members 312, 314 extending therefrom that are configured for insertion into the root end 106 of the spar 117. One of the members 312 has two spring-loaded prongs 316 extending therefrom for use in combination with a corresponding pair of apertures 117A in the spar 117, and functions to secure the root end support insert 302 in combination with the spar 117. The tip end support insert 304 comprises angular flanges 320 inserted into the tip end 108 of the spar 117 and having a plurality of apertures 322 formed therein corresponding to apertures in the tip end 108 of the spar 117 provided for securing the tip cap 109 to the blade subassembly 132. A plurality of bolts 324 are provided for use in combination with the apertures 322, thereby locating and securing the tip end support insert 304 to the spar 117.

Referring to FIGS. 6 and 8, each of the support inserts 302, 304 further comprises two guide members 326, 328 extending in a spanwise direction therefrom and terminating at a gearbox attachment plate 329 configured to facilitate attachment of the support inserts 302, 304 to their respective gearboxes 308, 306. In the described embodiment, the guide members 328 proximal to the trailing edge of the spar assembly 116 are cylindrical rollers configured for engaging the ramp surfaces 218 in the guide ramps 214, 216. In addition, each of the gearbox attachment plates 329 includes a guide surface 330 located on the side of the attachment plate 329 proximal to the guide members 326, 328. As will be more fully discussed below, the guide members 326, 328 and the guide surfaces 330 are configured for use in combination with the guide ramps 214, 216 to properly locate the spar assembly 116 during manufacture of the blade subassembly 132.

Referring to FIGS. 7 and 8, the tip end gearbox 306 and the root end gearbox 308 each are configured with conventional gearing arrangements such that each of the gearboxes 306, 308 are capable of translating the spar assembly 116 in a substantially vertical direction and also capable of rotating the spar assembly 116 about its longitudinal axis 123. In the described embodiment, the gearboxes 306, 308 are provided with rotatable cranks 334, 336 for manually urging the spar assembly 116 in the vertical and/or rotational directions. In alternative embodiments, electrical motors may be used in combination with the gearboxes 306, 308 to impart vertical and/or rotational movement to the spar assembly 116.

The crane apparatus 338 comprises a conventional overhead crane as is known in the art for hoisting materials in a manufacturing environment. In the described embodiment, the crane apparatus 338 includes hoist cables 340 connected to each of the gearboxes 306, 308, wherein the crane apparatus 338 is capable of translating the gearboxes 306, 308 in the vertical and/or horizontal directions.

LEADING-EDGE SHEATH INSTALLATION APPARATUS

Figure 9:
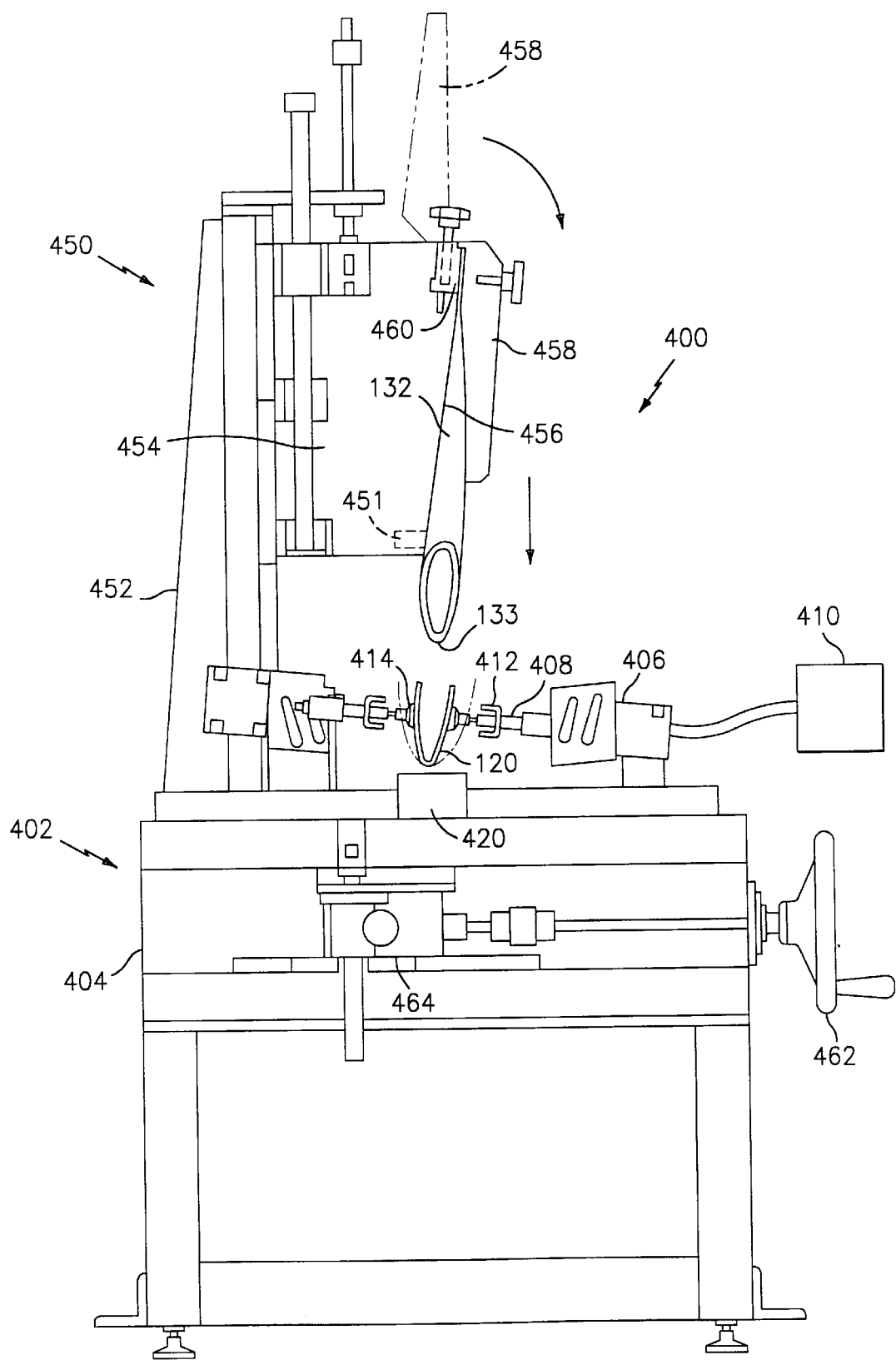
FIG. 9 is a plan view of a leading-edge sheath installation apparatus embodying features of the present invention.
Figure 10:
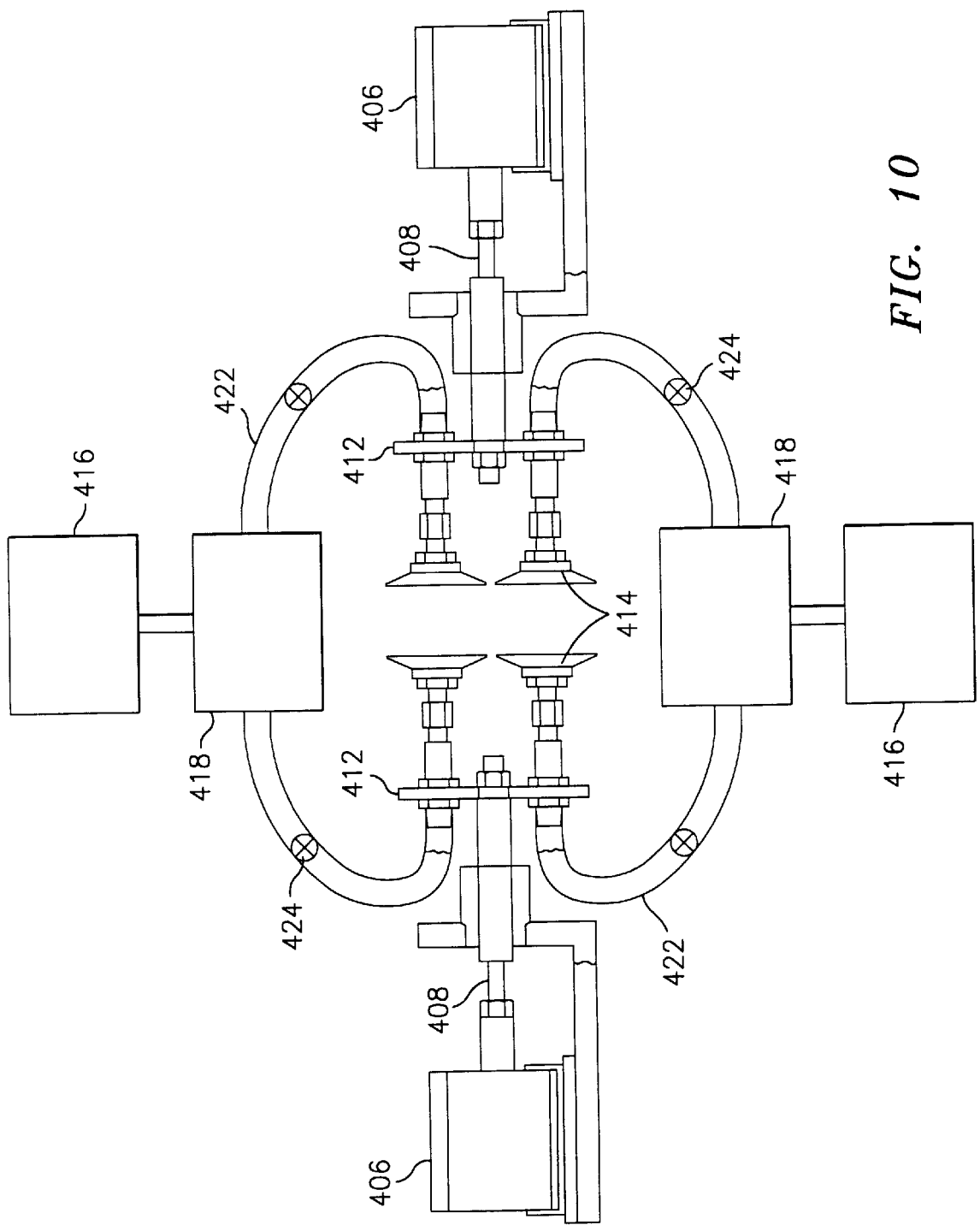
FIG. 10 is a schematic view depicting the interconnectivity of the pneumatic cylinders, suction cups, conduits, vacuum pumps, and vacuum accumulators of the leading-edge sheath installation apparatus of FIG. 9.
Figure 11:
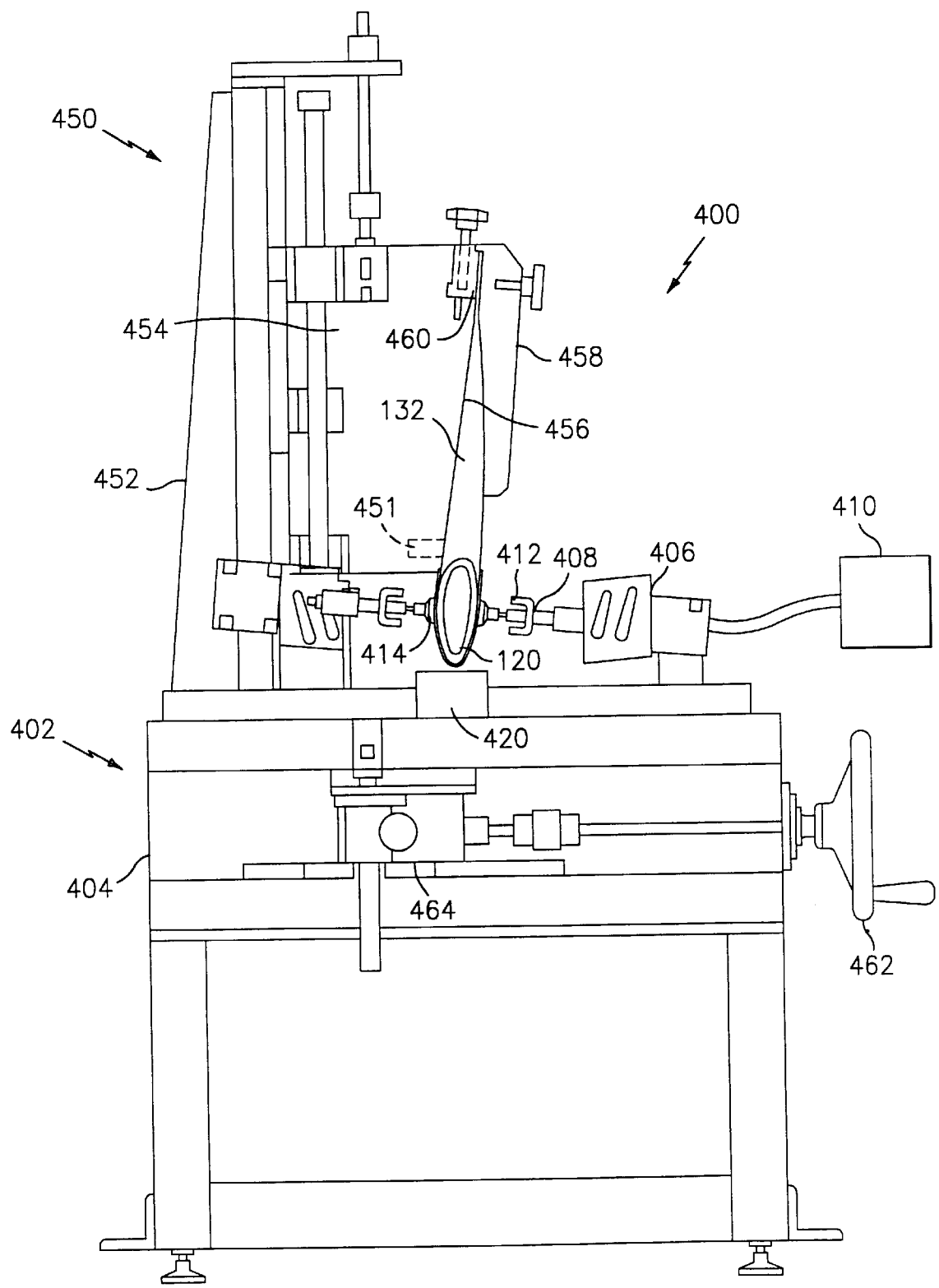
FIG. 11 is a plan view of the leading-edge sheath installation apparatus of FIG. 9, depicting the leading edge of the blade subassembly being inserted into the leading-edge sheath.

Referring to FIGS. 9, 10, and 11, the leading-edge sheath installation apparatus 400 comprises a lower assembly 402 connected to an upper assembly 450.

The lower assembly 402 comprises a base 404 having a plurality of pneumatic cylinders 406 connected thereto and aligned in opposed rows. Each of the pneumatic cylinders 406 includes a translating member 408 which is capable of translational movement in response to pressurized air provided to the pneumatic cylinders 406 by a pressurized air source 410. The translating members 408 are connected to opposed carriage members 412, wherein the carriage members 412 are configured to support a plurality of suction cups 414. The pneumatic cylinders 406, carriage members 412, and suction cups 414 are configured such that the opposed rows of suction cups 414 are capable of synchronized translational movement in response to the pressurized air provided by the pressurized air source 410.

In the described embodiment, the lower assembly 402 further comprises four vacuum pumps 416 connected to four vacuum accumulators 418, wherein the vacuum accumulators 418 are connected to the plurality of suction cups 414 using a plurality of corresponding conduits 422. The vacuum pumps 416 and vacuum accumulators 418 function in combination to provide suction forces to the plurality of suction cups 414. In the described embodiment, the plurality of suction cups 414, and their corresponding conduits 422, are divided into four circuits wherein each circuit is connected to one of the vacuum accumulators 418. A plurality of valves 424 are disposed in combination with the conduits 422, and function to regulate the vacuum pressure provided to the plurality of suction cups 414. The vacuum accumulators 418 are of a conventional design and have a predetermined storage capacity designed for quickly providing each suction cup 414 with vacuum pressure between approximately 67.73 kPa and 84.66 kPa (20 in. Hg and 25 in. Hg). A leading-edge sheath contour nest 420 is provided for interposition between the opposed rows of suction cups 414 and is configured to support the leading-edge sheath 120. In alternative embodiments, the number of vacuum pumps 416, vacuum accumulators 418, and circuits can vary from those in the described embodiment in order to meet operational requirements of those embodiments.

The upper assembly 450 includes five stanchions 452 extending substantially vertically from the base 404 and positioned spanwise at locations corresponding to the locations of the trailing-edge tooling tabs 130 of the blade subassembly 132. Each of the stanchions 452 has a contour clamp 454 connected thereto, wherein each of the contour clamps 454 includes a contour surface 456, a hinged securing member 458, and a tooling tab pin 460. The contour surfaces 456 and hinged securing members 458 are configured for clamping the blade subassembly 132 therebetween, wherein the tooling tab pins 460 function in combination with the blade subassembly 132 tooling tabs 130 to properly position the blade subassembly 132. In the described embodiment, each of the contour clamps 454 is capable of assuming an open configuration wherein the hinged securing member 458 is positioned distal from the contour surface 456, and a closed configuration wherein the hinged securing member 458 is positioned proximal to the contour surface 456 and functions to secure the blade subassembly 132. In addition, the upper assembly 450 also comprises three backwall pusher pin recesses 451 formed in the contour surfaces 456 and/or bridging members (not shown) extending between adjacent contour clamps 454 and positioned at spanwise and chordwise locations corresponding to the locator apertures 134 in the blade subassembly 132.

The contour clamps 454 are connected to the stanchions 452 such that the contour clamps 454 are capable of translational movement relative to the leading-edge sheath contour nest 420. In the described embodiment, a rotational wheel 462 and differential 464 are provided in a conventional gearing arrangement and mechanically coupled to the contour clamps 454 for manually urging the contour clamps 454 into translational movement relative to the contour nest 420. In alternative embodiments, the translational movement can be provided utilizing electrical motors and/or hydraulic systems.

METHOD FOR FABRICATING THE BLADE SUBASSEMBLY

Figure 12:
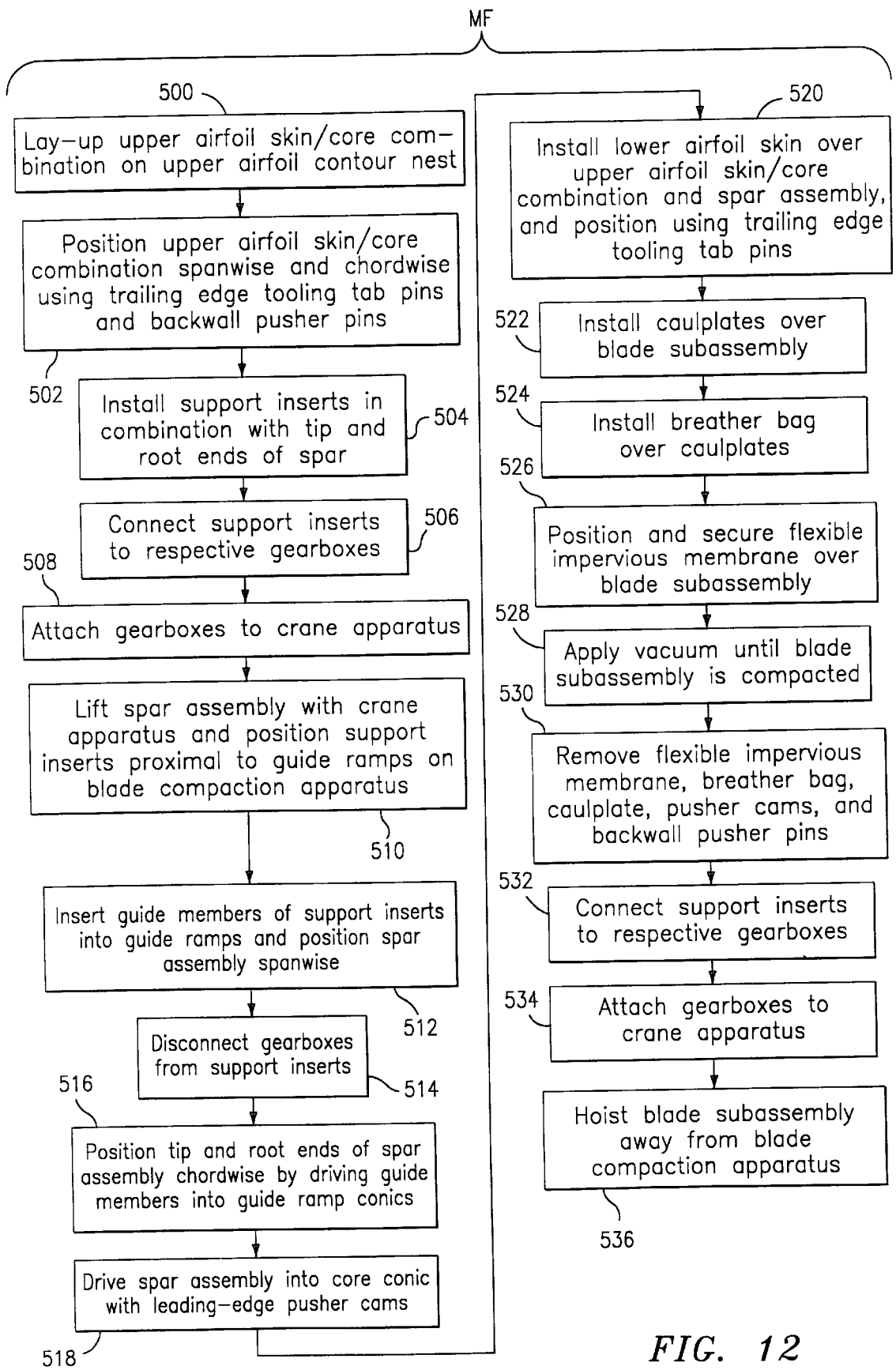
FIG. 12 is a flowchart illustrating a method for fabricating the blade subassembly embodying features of the present invention.

Referring to the blade subassembly 132, blade compaction apparatus 200, and support apparatus 300 illustrated in FIGS. 3A–D and 4–8, and referring to the flowchart of FIG. 12, a method MF for fabricating the blade subassembly 132 will now be discussed in greater detail.

In step 500, the upper airfoil skin 110 and core 114 are disposed upon the upper airfoil nest 208. In the described embodiment, the upper airfoil skin 110 and core 114 are adhesively bonded together prior to disposal upon the upper airfoil nest 208 in order to reduce fabrication time. In step 502, the upper airfoil skin 110 and core 114 combination is located spanwise and chordwise upon the upper airfoil nest 208 by disposing the apertures 131 in the trailing-edge tooling tabs 130 about the spring-loaded tooling tab pins 240. In addition, the backwall pusher-pins 228 are inserted through the locator apertures 134 in the core 114 and upper airfoil skin 110, and into the backwall pusher pin recesses 226.

In the described embodiment, adhesives (not shown) of a type known in the art for adhesively bonding blade spars to skin/core combinations are applied to the spar assembly 116 prior to proceeding to step 504. In step 504, the root end support insert 302 is connected to the root end 106 of the spar 117, and the tip end support insert 304 is connected to the tip end 108 of the spar 117. In steps 506 and 508, the root end support insert 302 is connected to the root end gearbox 308, the tip end support insert 304 is connected to the tip end gearbox 306, and then both gearboxes 306, 308 are, in turn, connected to the hoist cables 340 such that the spar assembly 116 is supported by the crane apparatus 338.

In step 510, the spar assembly 116 is hoisted by the crane apparatus 338 and positioned such that the root end support insert 302 is proximal to the guide ramp 214 on the inboard end 210 of the contoured upper airfoil nest 208, and such that the tip end support insert 304 is proximal to the guide ramp 216 on the outboard end 212 of the contoured upper airfoil nest 208. In step 512, the guide members 326, 328 of both the root end support insert 302 and the tip end support insert 304 are engaged with the ramp surfaces 218 in the guide ramps 214, 216. The spar assembly 116 is then positioned spanwise by abutting the guide surface 330 on the tip end support insert 304 against the guide ramp 216 on the outboard end 212 of the contoured upper airfoil nest 208. In step 514, the root end gearbox 308 is disconnected from the root end support insert 302, and the tip end gearbox 306 is disconnected from the tip end support insert 304.

In step 516, the root end 106 and tip end 108 of the spar assembly 116 are properly positioned chordwise by driving the guide members 326, 328 into the ramp surfaces 218 with the threaded bolts 224 until the guide members 328 proximal to the trailing edge of the spar assembly 116 abut the conic 222 in each of the ramp surfaces 218. Proper positioning of the root end 106 and tip end 108 of the spar assembly 116 does not necessarily ensure that the rest of the spar assembly 116 will have the proper chordwise alignment. To properly locate the entire spar assembly 116 chordwise, in step 518, the leading-edge pusher cams 230 are actuated such that the camming surfaces 232 engage the hardpoints 136 on the spar assembly 116 and drive the backwall blocks 119 of the spar assembly 116 against the backwall pusher pins 228. It will be appreciated that the backwall pusher pins 228 are located chordwise such that contact between the backwall blocks 119 and the backwall pusher pins 228 ensures proper seating of the trailing edge of the spar assembly 116 within the conic 121 defined by the core 114. After the spar assembly 116 has been properly located, adhesives (not shown) are applied to both the core 114 and spar assembly 116 in preparation for receiving the lower airfoil skin 112.

In step 520 the lower airfoil skin 112 is disposed onto the core 114 and spar assembly 116 and is located spanwise and chordwise using the lower airfoil skin's 112 trailing-edge tooling tabs 130 in combination with the spring-loaded tooling tab pins 240. In step 522, a caulplate 242 is disposed over the blade subassembly 132 (see FIG. 6), and functions to distribute the compaction forces applied to the blade subassembly 132 by the flexible impervious membrane 254 during compaction. In step 524, a fiberglass breather bag 244 is disposed over the caulplate 242 (see FIG. 6) and functions to assist in the evacuation of air trapped between the caulplate 242 and the flexible impervious membrane 254 during compaction, and to reduce friction between the blade subassembly 132 and the flexible impervious membrane 254.

In step 526, the support structure 252 is pivoted to the second position and secured in place such that the flexible impervious membrane 254 covers the blade subassembly 132 and the contoured upper airfoil nest 208, thereby forming the airtight molding cavity 258 therebetween. In step 528, the vacuum source 234 is activated, thereby evacuating air from within the molding cavity 258. In the described embodiment, the vacuum pressure supplied by the vacuum source 234 is approximately equal to 44.02 kPa (13 in. Hg). Evacuation of the air from within the molding cavity 258 causes the flexible impervious membrane 254 to be drawn toward the contoured upper airfoil nest 208, thereby providing compaction forces to the components of the blade subassembly 132. In the described embodiment, for a vacuum pressure of approximately 44.02 kPa (13 in. Hg), a compaction duration of approximately 30 minutes provides appropriate compaction to blade subassembly 132.

In step 530, the vacuum source 234 is deactivated, and the support structure 252 is pivoted back to the first position, wherein the flexible impervious membrane 254 is no longer covering the blade subassembly 132. To prepare the compacted blade subassembly 132 for removal from the blade compaction apparatus 200, the breather bag 244, caulplate 242, leading-edge pusher cams 230, and backwall pusher pins 228 are all removed. In steps 532 and 534, the root end support insert 302 is reconnected to the root end gearbox 308, the tip end support insert 304 is reconnected to the tip end gearbox 306, and then both gearboxes 306, 308 are, in turn, reconnected to the hoist cables 340 such that the blade subassembly 132 is supported by the crane apparatus 338.

In step 536, the threaded bolts 224 are loosened and the guide members 326, 328 are slid out of the ramp surfaces 218 such that the root end support insert 302 and the tip end support insert 304 are no longer constrained by the blade compaction apparatus 200. The blade subassembly 132 is then transpositioned by the support apparatus 300 from the blade compaction apparatus 200 to the leading-edge sheath installation apparatus 400.

METHOD FOR INSTALLING THE LEADING-EDGE SHEATH

Figure 13:
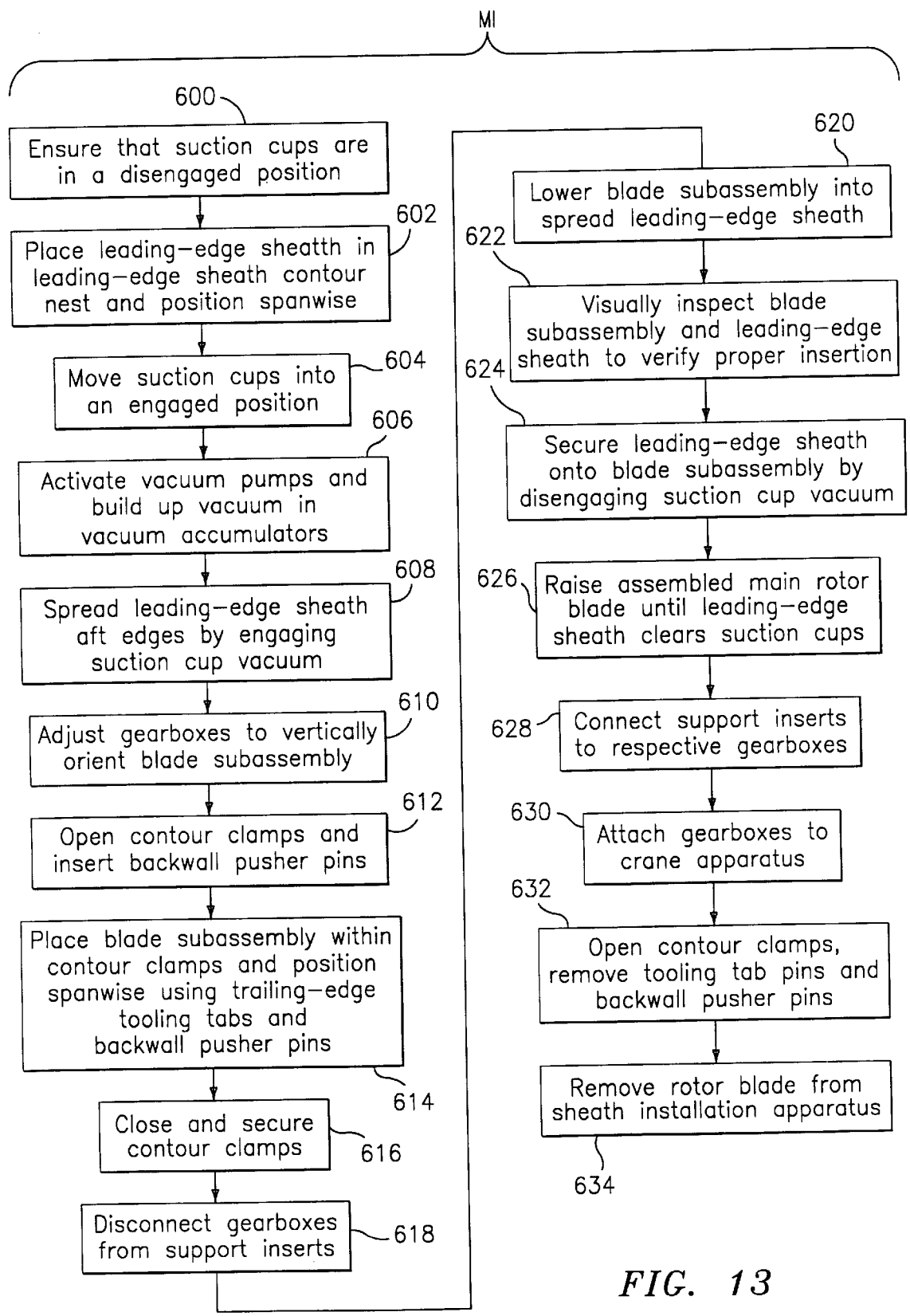
FIG. 13 is a flowchart illustrating a method for installing the leading-edge sheath onto the blade subassembly, embodying features of the present invention.

Referring to the blade subassembly 132, support apparatus 300, and leading-edge sheath installation apparatus 400 illustrated in FIGS. 3A–D and 7–11, and referring to the flowchart of FIG. 13, a method MI for installing the leading-edge sheath 120 in combination with the compacted blade subassembly 132 will now be discussed in greater detail.

In preparation for placement of the leading-edge sheath 120 within the leading-edge sheath installation apparatus 400, in step 600, the opposed rows of suction cups 414 are checked to ensure that the suction cups 414 are in a disengaged position wherein the opposed rows of suction cups 414 are spaced-apart a distance greater that a width $W_{LES}$ of the leading-edge sheath 120 (see FIG. 3C). In step 602, the leading-edge sheath 120 is placed within the leading-edge sheath contour nest 420, and positioned spanwise by abutting the tip end of the leading-edge sheath 120 against a tooling stop (not shown). In step 604, the opposed rows of suction sups 414 are moved by the pneumatic cylinders 406 into an engaged position such that each of the plurality of suction cups 414 is in abutting engagement with the respective outer mold line (OML) surfaces of the aft edges of the leading-edge sheath 120.

In step 606, the vacuum pumps 416 are activated, thereby accumulating vacuum pressures in each of the corresponding vacuum accumulators 418. In step 608, the valves 424 are opened such that the vacuum pressures accumulated in the vacuum accumulators 418 are provided to the plurality of suction cups 414, thereby generating suction forces between each of the plurality of suction cups 414 and the OML surfaces of the leading-edge sheath 120. In the described embodiment, each of the suction cups 414 comprises a bellow-shaped design such that upon opening of the valves 424, the bellow-shaped portion of each suction cup 414 collapses, thereby causing the OML surfaces of the aft edges of the leading-edge sheath 120 to be pulled towards the opposed carriage members 412. In the described embodiment, the suction cups 414 are configured such that upon application of a vacuum pressure between approximately 67.73 kPa and 84.66 kPa (20 in. Hg and 25 in. Hg), the bellow-shaped portion of each suction cup 414 collapses approximately 1.27 cm (0.5 in.) such that the width $W_{LES}$ of the leading-edge sheath 120 increases by approximately 2.54 cm (1 in.). In alternative embodiments, the design of the suction cups 414 and the magnitude of the suction forces applied to the suction cups 414 can be modified from the described embodiment to increase or decrease the spread of the leading-edge sheath 120. In addition, the pneumatic cylinders 406 can be used to translate the opposed rows of suction cups 414 away from each other such that additional spread of the leading-edge sheath 120 is achieved.

Prior to placement of the blade subassembly 132 in combination with the leading-edge sheath installation apparatus 400, adhesives (not shown) can be applied to the leading-edge 133 of the blade subassembly 132 (see FIG. 9) for use in adhesively bonding the leading-edge sheath 120 onto the blade subassembly 132. In step 610, the root end and tip end gearboxes 306, 308 of the support apparatus 300 are adjusted to ensure that the blade subassembly 132 is in a substantially vertical orientation with the leading-edge 133 of the blade subassembly 132 facing down. In step 612, the backwall pusher pins 228 are inserted into the backwall pusher pin recesses 451 in the upper assembly 450 of the leading-edge sheath installation apparatus 400, and the contour clamps 454 are placed in the open configuration such that the hinged securing members 458 are positioned distal from the contour surfaces 456. In step 614, the blade subassembly 132 is transported by the support apparatus 300 to the open contour clamps 454 and is placed therein such that the backwall pusher pins 228 are inserted through the locator apertures 134 in the upper airfoil skin 110 and core 114, and such that the tooling tab pins 460 are inserted through the corresponding tooling tab apertures 131, thereby ensuring proper alignment of the blade subassembly 132 in the leading-edge sheath installation apparatus 400. In step 616, the contour clamps 454 are placed in the closed configuration such that the hinged securing members 458 are positioned in abutting engagement with the lower airfoil skin 112 of the blade subassembly 132, thereby securing the blade subassembly 132 within the contour clamps 454.

In step 618, the root end gearbox 308 is disconnected from the root end support insert 302, and the tip end gearbox 306 is disconnected from the tip end support insert 304. In step 620, the contour clamps 454 are translated downward using the rotational wheel 462 such that the leading edge 133 of the blade subassembly 132 is inserted into the spread leading-edge sheath 120. In step 622, the leading edge 133 of the blade subassembly 132 and the leading-edge sheath 120 are visually inspected to ensure that the leading edge 133 of the blade subassembly 132 is properly inserted into the leading-edge sheath 120 such that the aft edges of the leading-edge sheath 120 overlap both the upper airfoil skin 110 and the lower airfoil skin 112. In particular, step 622 is a check to ensure that the aft edges of the leading-edge sheath 120 do not cause separation between either the upper airfoil skin 110 or the lower airfoil skin 112 and the spar assembly 116.

In step 624, the valves 424 disposed in combination with the conduits 422 are closed such that the supply of vacuum pressure to the plurality of suction cups 414 is discontinued, thereby causing the leading-edge sheath 120 to be fitted in combination with the leading edge 133 of the blade subassembly 132. In step 626, the contour clamps 454 are translated upward using the rotational wheel 462 such that the leading edge 102 of the assembled main rotor blade 100 clears the opposed rows of suction cups 414. In steps 628 and 630, the root end support insert 302 is reconnected to the root end gearbox 308, the tip end support insert 304 is reconnected to the tip end gearbox 306, and then both gearboxes 306, 308 are, in turn, reconnected to the hoist cables 340 such that the main rotor blade 100 is supported by the crane apparatus 338.

In steps 632 and 634, the contour clamps 454 are opened and the main rotor blade 100 is separated from the tooling tab pins 460 and backwall pusher pins 228 such that the main rotor blade 100 can be transported by the support apparatus 300 away from the leading-edge sheath installation apparatus 400.

It will be readily seen by one of ordinary skill in the art that the present invention fulfills all the objects set forth above. After reading the foregoing specification, one of ordinary skill will be able to effect various changes, substitutions of equivalents and various other aspects of the invention as broadly disclosed herein. It is therefore intended that the protection granted hereon be limited only by the definition contained in the appended claims and equivalents thereof.

What is claimed is:

1. A method for fabricating a helicopter blade subassembly comprising a lower airfoil skin, a core having a conic formed therein, an upper airfoil skin, and a spar assembly having a tip end and a root end, said method comprising the steps of:

(a) providing a blade compaction apparatus having a lower assembly configured for mating with an upper assembly, said lower assembly comprising
a base having a contoured upper airfoil nest, said contoured upper airfoil nest having a root end and a tip end,
at least two guide ramps disposed proximal to said contoured upper airfoil nest, said guide ramps defining conics therein, at least one of said guide ramps being disposed proximal to said root end, and at least one of said guide ramps being disposed proximal to said tip end, and
a plurality of leading-edge pusher cams disposed proximal to said contoured upper airfoil nest, said upper assembly comprising a support structure supporting a flexible impervious membrane, said flexible impervious membrane and said contoured upper airfoil nest defining a molding cavity therebetween upon mating of said upper assembly to said lower assembly;

(b) disposing said upper airfoil skin and said core in combination with said contoured upper airfoil nest;

(c) connecting a tip end support insert in combination with said tip end of said spar assembly, and connecting a root end support insert in combination with said root end of said spar assembly, said tip end support insert and said root end support insert each having guide surfaces and guide members configured for use in combination with said guide ramps;

(d) locating said spar assembly in spanwise alignment in said contoured upper airfoil nest by abutting at least one of said guide surfaces against at least one of said guide ramps;

(e) locating said spar assembly in chordwise alignment in said contoured upper airfoil nest by driving said guide members into said conics in said guide ramps and driving said spar assembly into said conic in said core with said leading-edge pusher cams;

(f) disposing said lower airfoil skin in combination with said core and said spar assembly to form the helicopter blade subassembly;

(g) mating said upper assembly to said lower assembly; and (h) evacuating air from said molding cavity, whereby evacuating said air causes said flexible impervious membrane to apply compaction forces to the helicopter blade subassembly.

2. The method of claim 1, further comprising the step of installing a caul plate and a breather bag over said blade subassembly prior to said step of mating said upper assembly to said lower assembly step.

3. The method of claim 1, wherein said lower assembly further comprises a vacuum source having a plurality of conduits extending therefrom and terminating at a corresponding plurality of openings in said contoured upper airfoil nest, whereby said vacuum source is operable to evacuate said air from said molding cavity.

4. The method of claim 1, further comprising a tip end support assembly configured for connection to said tip end support insert and a root end support assembly configured for connection to said root end support insert, said tip end support assembly and said root end support assembly being operative to support said spar assembly or said blade subassembly.

5. The method of claim 4, wherein said tip end support assembly and said root end support assembly comprise:

a tip end gearbox connected to said tip end support insert and a root end gearbox connected to said root end support insert, said tip end and said root end gearboxes being operable to rotate said spar assembly or said blade subassembly about a longitudinal axis of said spar assembly, and operable to translate said spar assembly or said blade subassembly in a substantially vertical direction; and a crane apparatus connected to said tip end and said root end gearboxes, said crane apparatus being operable to translate said spar assembly or said blade subassembly in a substantially vertical direction and a substantially horizontal direction.

6. A method for installing a leading-edge sheath in combination with a compacted helicopter blade subassembly having a leading edge, said method comprising the steps of:

(a) providing a leading-edge sheath installation apparatus having a lower assembly and an upper assembly, said lower assembly comprising opposed carriage members connected to a base, each of said opposed carriage members supporting a plurality of suction cups, said opposed carriage members being capable of synchronized translational movement, a vacuum system connected in fluid communication with said plurality of suction cups, said vacuum system being capable of providing vacuum pressure to said plurality of suction cups, said upper assembly comprising a plurality of stanchions having a plurality of contour clamps for supporting said compacted helicopter blade subassembly said plurality of contour clamps being capable of translational movement relative to said lower assembly;

(b) supporting said leading-edge sheath between said opposed carriage members;

(c) imparting said translational synchronized movement to said opposed carriage members to an engaged position such that said plurality of suction cups are in abutting engagement with said leading-edge sheath;

(d) providing said vacuum pressure to said plurality of suction cups using said vacuum system, whereby said vacuum pressure generates suction forces between said plurality of suction cups and said leading-edge sheath, causing said leading-edge sheath to assume a spread configuration;

(e) supporting said compacted helicopter blade subassembly using said plurality of contour clamps; and (f) imparting said translational movement to said plurality of contour clamps such that said leading edge of said helicopter blade subassembly is inserted into said leading-edge sheath.

7. A method for fabricating a helicopter main rotor blade assembly having a blade subassembly comprising a lower airfoil skin, a core having a conic formed therein, an upper airfoil skin, and a spar assembly having a tip end and a root end, said method comprising the steps of:

(a) providing a blade compaction apparatus having a lower assembly configured for mating with an upper assembly, said lower assembly comprising a base having a contoured upper airfoil nest, said contoured upper airfoil nest having a root end and a tip end, at least two guide ramps disposed proximal to said contoured upper airfoil nest, said guide ramps defining conics therein, at least one of said guide ramps being disposed proximal to said root end, and at least one of said guide ramps being disposed proximal to said tip end, and a plurality of leading-edge pusher cams disposed proximal to said contoured upper airfoil nest, said upper assembly comprising a support structure supporting a flexible impervious membrane, said flexible impervious membrane and said contoured upper airfoil nest defining a molding cavity therebetween upon mating of said upper assembly to said lower assembly;

(b) disposing said upper airfoil skin and said core in combination with said contoured upper airfoil nest;

(c) connecting a tip end support insert in combination with said tip end of said spar assembly, connecting a root end support insert in combination with said root end of said spar assembly, said tip end support insert and said root end support insert each having guide surfaces and guide members configured for use in combination with said guide ramps;

(d) locating said spar assembly in spanwise alignment in said contoured upper airfoil nest by abutting at least one of said guide surfaces against at least one of said guide ramps;

(e) locating said spar assembly in chordwise alignment in said contoured upper airfoil nest by driving said guide members into said conics in said guide ramps and driving said spar assembly into said conic in said core with said leading-edge pusher cams;

(f) disposing said lower airfoil skin in combination with said core and said spar assembly to form the blade subassembly;

(g) mating said upper assembly to said lower assembly;

(h) evacuating air from said molding cavity, whereby evacuating said air causes said flexible impervious membrane to apply compaction forces to said blade subassembly, thereby forming a compacted blade subassembly having a leading edge;

(i) providing a leading-edge sheath installation apparatus having a lower assembly and an upper assembly, said lower assembly comprising opposed carriage members connected to a base, each of said opposed carriage members supporting a plurality of suction cups, said opposed carriage members being capable of synchronized translational movement, a vacuum system connected in fluid communication with said plurality of suction cups, said vacuum system being capable of providing vacuum pressure to said plurality of suction cups, said upper assembly comprising a plurality of stanchions having a plurality of contour clamps for supporting said compacted helicopter blade subassembly, said plurality of contour clamps being capable of translational movement relative to said lower assembly;

(j) supporting a leading-edge sheath between said opposed carriage members;

(k) imparting said translational synchronized movement to said opposed carriage members to an engaged position such that said plurality of suction cups are in abutting engagement with said leading-edge sheath;

(l) providing said vacuum pressure to said plurality of suction cups using said vacuum system, whereby said vacuum pressure generates suction forces between said plurality of suction cups and said leading-edge sheath, causing said leading-edge sheath to assume a spread configuration;

(m) supporting said compacted blade subassembly using said plurality of contour clamps; and (n) imparting said translational movement to said plurality of contour clamps such that said leading edge of said helicopter blade subassembly is inserted into said leading-edge sheath.

* * * * *